(12) United States Patent
Bueter (10) Patent No.: US 12,066,040 B2
(45) Date of Patent: Aug. 20, 2024

(54) WORKING CYLINDER WITH END POSITION DAMPING, AND DAMPING PISTON RING

(71) Applicants: BÜMACH ENGINEERING INTERNATIONAL B.V., Emmen (NL); Josef Bueter, Haren/Altenberge (DE)

(72) Inventor: Josef Bueter, Haren/Altenberge (DE)

(73) Assignee: Bümach Engineering International B.V., Emmen (NL)

( * ) Notice: Subject to any disclaimer, the term of this patent is extended or adjusted under 35 U.S.C. 154(b) by 0 days.

(21) Appl. No.: 18/249,412

(22) PCT Filed: Oct. 19, 2020

(86) PCT No.: PCT/DE2020/000248
§ 371 (c)(1),
(2) Date: Apr. 18, 2023

(87) PCT Pub. No.: WO2022/083811
PCT Pub. Date: Apr. 28, 2022

(65) Prior Publication Data
US 2023/0392617 A1    Dec. 7, 2023

(51) Int. Cl.
| F15B 15/22 | (2006.01) |
| F15B 15/14 | (2006.01) |
| F16J 9/08 | (2006.01) |
| F16J 9/14 | (2006.01) |

(52) U.S. Cl.
CPC ........ *F15B 15/224* (2013.01); *F15B 15/1452* (2013.01); *F16J 9/08* (2013.01); *F16J 9/14* (2013.01)

(58) Field of Classification Search
CPC ......... F15B 15/223; F15B 15/224; F16J 9/08; F16J 9/14; F16J 9/18; F16J 9/20
USPC ...................................... 91/399, 409; 92/85 B
See application file for complete search history.

(56) References Cited

U.S. PATENT DOCUMENTS

| 2,962,332 | A | 11/1960 | Hale |
| 4,048,905 | A | 9/1977 | Souslin |
| 4,138,125 | A | 2/1979 | Lucas |
| 4,207,800 | A | 6/1980 | Homuth |
| 4,207,802 | A * | 6/1980 | Homuth ................ F15B 15/224 91/405 |

(Continued)

FOREIGN PATENT DOCUMENTS

| CN | 22227235 Y | 5/1996 |
| EP | 0695894 A1 | 2/1996 |

(Continued)

*Primary Examiner* — Michael Leslie
(74) *Attorney, Agent, or Firm* — Laurence A. Greenberg; Werner H. Stemer; Ralph E. Locher (57) ABSTRACT

A working cylinder which has end-position damping. A piston ring passes over an axially offset pressure medium connection and encloses a pressure medium damping volume. The piston ring includes a ring joint which has a base section and a projection section. The piston ring is of sealing construction. The pressure medium flows out of the pressure medium damping volume via an axial transfer channel, which can be defined by an axial cylinder-tube groove or an axial piston-ring groove. Also, there is a damping piston ring, which is of sealing construction and which has an axial piston-ring groove.

9 Claims, 9 Drawing Sheets

(56) References Cited

U.S. PATENT DOCUMENTS

| | | | | | |
|---|---|---|---|---|---|
| 4,425,836 | A | * | 1/1984 | Pickrell | F15B 15/224 |
| | | | | | 91/405 |
| 4,575,107 | A | * | 3/1986 | Umegawa | F16J 9/00 |
| | | | | | 277/499 |
| 6,047,627 | A | * | 4/2000 | Bueter | F15B 15/224 |
| | | | | | 91/405 |
| 7,171,888 | B2 | * | 2/2007 | Boecker | F15B 15/222 |
| | | | | | 91/394 |
| 2023/0304579 | A1 | * | 9/2023 | Bueter | F16J 9/20 |
| 2023/0304580 | A1 | * | 9/2023 | Bueter | F16J 9/20 |

FOREIGN PATENT DOCUMENTS

| | | | |
|---|---|---|---|
| EP | 0949422 | B1 | 9/2001 |
| EP | 2453150 | A1 | 5/2012 |
| ES | 2079991 | A1 | 1/1996 |
| GB | 2024945 | A | 1/1980 |
| JP | S60118007 | U | 8/1985 |
| JP | H0650306 | A | 2/1994 |
| JP | 2012052637 | A | 3/2012 |

* cited by examiner

WORKING CYLINDER WITH END POSITION DAMPING, AND DAMPING PISTON RING

FIELD AND BACKGROUND OF THE INVENTION

The invention relates to a working cylinder with end position damping and to a damping piston ring.

Various damping solutions are known from the state of the art. The objective of these solutions is to decelerate constantly or progressively the movement of a piston within a hydraulic working cylinder in a defined range. In particular, the deceleration of the movement can be provided by throttling the outflow of the hydraulic fluid by means of a damping element. This damping element reduces the cross section via which the hydraulic fluid can flow out.

EP 0 949 422 B1 discloses a solution in which a ring gap of a damping ring, which rests resiliently against the inner wall of the cylinder, functions as a flow-limiting bottleneck. For progressive damping, the damping zone of the cylinder has a conical design. Thus, with progressive movement in the damping zone, the damping ring is compressed and the ring gap of the damping ring is progressively reduced. This is a proven solution that makes an important contribution to the state of the art; however, its manufacture is technologically very demanding due to the required precision of the gap design between the piston and the inner wall of the cylinder. Moreover, a problem according to the state of the art is the unavoidable wear of the piston ring. As a result of the material removal on the outer circumference of the piston ring due to wear, the ring gap progressively widens so that the damping behavior changes.

SUMMARY OF THE INVENTION

The task of the invention is to disclose a damping solution for a working cylinder with end-position damping, which provides highly precise and easily adjustable damping, is suitable for different cylinder types, has a high level of robustness and operational reliability, which does not change the damping behavior due to wear, and which can also be produced in a simple and cost-effective manner. Furthermore, it is the task of the invention to disclose a damping piston ring which can be used to provide damping solutions in working cylinders.

The task is solved by a working cylinder with end-position damping with the features specified in the first independent claim. Preferred further embodiments result from the dependent claims. Furthermore, the task is fulfilled by a damping piston ring with the features specified in the further independent claim.

According to the invention, the working cylinder with end-position damping comprises a cylinder and a piston unit.

The cylinder according to the invention comprises a cylinder tube as well as a first and a second closure part.

According to the invention, the first closure part is arranged at the first cylinder tube end and the second closure part is arranged at the second cylinder tube end of the cylinder tube. The two closure parts are arranged in such a way that they are connected to the respective cylinder tube ends in a pressure-tight manner. To provide such a connection, the two closure parts are preferably welded to the cylinder tube along the common circumferential contact surface. Other connections, for example screw joints, are also possible.

According to the invention, the cylinder tube and the closure parts form a cylinder interior. The cylinder interior is understood to be the interior of the cylinder which is formed by the closure parts and the cylinder tube and in which the pressure medium is located when the system is used as intended. Further, the piston is arranged in the cylinder interior.

According to the invention, the cylinder has a damping zone in at least one end region. The damping zone is the area of the cylinder interior in which damping takes place when the piston unit moves in.

Damping is understood to be a force effect that slows down the movement of the piston unit.

The damping zone is located at least at one end region of the cylinder tube and comprises the part of the cylinder interior between a pressure medium connection and an axial delimitation provided by the closure part which is arranged at this end region.

The cylinder according to the invention has a laterally arranged pressure medium connection, wherein the pressure medium connection is assigned to the damping zone and axially spaced from the axial limitation of the cylinder interior.

The damping zone extends between the pressure medium connection and the axial limitation. The axial limitation positively blocks the further movement of the piston unit and thus defines the maximum movement path of the piston unit axially on one side.

The axial limitation is preferably formed by the closure part. For this purpose, the closure part has a corresponding stop surface against which the piston unit can rest so that it assumes its end position.

In special designs, the end position of the piston unit in operation can also be before the axial limitation is reached.

The piston unit according to the invention comprises a piston and a piston ring. Preferably, the piston unit is composed of a piston rod and the piston.

Depending on the type of the working cylinder, the piston unit can be designed differently. For example, the piston rod can be guided completely through or only partially in the piston. Furthermore, the piston unit may be designed as a monolithic component and then it may comprise only a piston rod section and a piston section.

According to the invention, the piston unit slidably passes through the first closure part and forms at least one working chamber in the cylinder interior.

For this purpose, the first closure part is designed to receive the piston unit in a sliding manner and comprises sealing and guide units.

According to the invention, the piston is guided by means of a guide element in an axially displaceable manner in the cylinder interior.

For this purpose, the piston has at least one receiving section for a guide. The receiving section is preferably designed as a groove into which a guide ring is inserted to function as a guide.

According to the invention, the piston has a circumferential ring groove on a radial outer lateral surface. The piston ring is arranged in this ring groove.

To this end, the circumferential inner ring groove is designed to receive the piston ring and to fix it in its axial position. Furthermore, the circumferential ring groove is designed to permit a radial movement of the piston ring at least to the extent that it can deform itself resiliently. This effect is achieved by a sufficient depth of the circumferential ring groove.

According to the invention, the piston ring is in resilient contact with the inner wall of the cylinder. For this purpose, the piston ring is provided in a resilient, in particular radially elastic design and, in a relaxed state, it has an outer diameter which is larger than the inner diameter of the cylinder tube.

When the piston unit is inserted into the cylinder tube, the piston ring assumes a state of stress in the circumferential inner ring groove and rests against the inner wall of the cylinder. In this state of stress, the piston ring deforms elastically and reduces its outer diameter.

The end-position-damped piston ring according to the invention is characterized in particular by the special design of the piston ring.

The piston ring is a substantially rotationally-symmetric part which has an interruption on the circumference and thus comprises a ring body and a ring joint.

The ring body comprises a ring body surface and a first and a second ring body end.

The ring body surface comprises in particular a radial ring surface and a first axial ring surface. A second axial ring surface is located opposite the first axial ring surface in a manner known per se.

The radial ring surface is designed as a sliding contact surface that is axially displaceable with respect to a cylindrical inner barrel surface of a cylinder. Therefore, the radial ring surface is in contact with the inner wall of the cylinder in a manner known per se when the piston according to the invention is used as intended, wherein the physical contact exists in the form of a sliding contact when the piston is moved relative to the cylinder.

In addition, the ring body surface comprises the first axial ring surface, which is designed as a contact surface to an axial ring groove surface of the ring groove of the piston.

In compliance with the intended use, the piston ring according to the invention engages in the ring groove of the piston. The design of the first axial ring surface, which, when used as intended, slidingly rests at a correspondingly designed lateral axial ring surface of the circumferential ring groove of the piston, permits the dynamic expansion of the piston ring. The pressure of the pressure medium acting radially outward on the piston ring on an inner radial ring surface leads to a radial expansion of the piston ring and to a force effect on the surface pressure between the radial ring surface and the inner barrel surface of the cylinder. This in turn causes an increased sealing effect. At the same time, when the piston moves backwards without a pressure difference between the piston sides, the surface pressure is reduced to the surface pressure based on the spring effect and thus wear is also reduced.

In addition, the inclined ring surface supports an automatic readjustment of the piston ring in the event of wear of the radial ring surface or of the inner wall of the cylinder.

According to the invention, the ring body ends are arranged opposite to each other at the ring joint. Thus, they form the ring joint.

According to the invention, the first ring body end and the second ring body end are designed to complement one another. Specifically, the first ring body end comprises a projection section and the second ring body end comprises a base section for this purpose.

The first ring body end comprises the projection section with a projection contour cross section. The projection contour cross section is defined by the shape of the projection and denotes the contour of the projection section in a radial sectional plane parallel to a main longitudinal axis. The projection contour is thus formed by a physical section of the piston ring.

The second ring body end comprises a base section with a base section contour, wherein the base section also forms a receiving contour with a receiving contour cross section. The base section contour is formed by a physical section of the piston ring, whereas the receiving contour is a free space. The receiving contour cross section is defined by the space not filled by the base section contour, wherein this contour is also a contour in the radial section plane parallel to the main longitudinal axis. It is the same sectional plane as for the projection contour cross section.

Further, the projection section engages in the receiving contour according to the invention. To this end, the receiving contour cross section and the projection contour cross section coincide. The projection contour cross section as a physical category fills the receiving contour cross section as a free space.

According to the invention, a projection section separating surface of the projection section and a base section separating surface of the base section are opposite to each other in an areal and sealing physical contact and form a separating plane. Hereinafter, the projection section separating surface and the base section separating surface are collectively also referred to as the separating surfaces.

The separating plane has an inclination with respect to the first axial ring surface. Inclination it is to be understood such that the separating plane has an inclination with respect to the first axial ring surface and thus simultaneously to a main areal plane of the piston ring.

According to the invention, the separating plane is further characterized by the fact that it intersects the radial ring surface and forms an outer separating line at an intersection line of the separating plane with the radial ring surface.

In addition, the separating plane also intersects the first axial ring surface and forms an inner separating line at an intersection line of the separating plane with the first axial ring surface.

Hereinafter, the outer separating line and the inner separating line are also collectively referred to as the separating lines.

The two separating lines also define the two separating surfaces. They are the radial limitations of the two separating surfaces.

In particular, the piston ring according to the invention is characterized in that at least one of the two separating lines has a curvature radius which is concentric with respect to the ring body.

Thus, a solution has been surprisingly found which reliably provides almost complete sealing against fluid and gaseous pressure media, as the ring body ends automatically align axially, radially and also tangentially relative to each other by the inclination of the separating plane and by the concentric separating line design so that a sealing areal physical contact is formed at the separating surfaces.

The ring body ends engaging one into the other and being designed in this way have a very precise sealing geometry that exhibits a sealing overlap even with variable circumferential expansion and the resulting changing ring gap. This feature also results from the fact that at least one separating line, preferably both separating lines, has/have a concentric curvature radius. Thus, the piston ring can expand or contract in the circumferential direction at any time and the seal via the separating line is maintained. The expansion or contraction around the circumference can result from an undulating shape of the inner barrel surface of the cylinder or from temperature-induced expansion or shrinkage or from wear.

Advantageously, the piston ring according to the invention is capable to compensate for these factors while simultaneously maintaining its particularly high tightness.

In addition, the projection section can slide radially and in circumferential direction on the separating surface to the base section at any time. This ensures wear compensation at all times, resulting in a consistent sealing function.

It is also advantageous that a solution has been found in which the sealing piston ring can be designed with two axial ring surfaces in the outer contour which are parallel to one another and lie in its main areal plane so that the ring groove of the piston can be formed in a structurally simple manner with parallel axial walls for receiving the piston ring.

A particular advantage of the sealing piston ring is that it can be provided with a substantially rectangular geometry of its outer cross section so that the ring groove in the piston can be designed in a particularly simple manner.

Furthermore, the working cylinder with end-position damping according to the invention has at least one axial overflow channel. It is alternatively or cumulatively designed as an axial groove of a cylinder tube inner barrel surface or as an axial groove of a piston ring outer lateral surface. Hereinafter, the axial groove of the cylinder tube inner barrel surface will also be abbreviated to cylinder-tube axial groove, the axial groove of the piston ring outer lateral surface will also be abbreviated to piston-ring axial groove, and both together will also be abbreviated collectively to the axial grooves. The cylinder-tube axial groove is arranged axially in the damping zone. The piston-ring axial groove is arranged in the radial ring surface. In both alternative designs, the axial groove is configured such that it allows a pressure fluid overflow through the cross section of the axial groove.

According to the invention, the piston unit is designed to pass axially with the piston ring over the pressure medium connection during a retraction movement into the damping zone and to enclose a damping pressure medium volume in a damping zone chamber in the damping zone.

When the piston ring passes over the pressure fluid connection during the retraction movement, it reaches the damping zone. At the same time, a damping pressure medium volume is enclosed. Now, the pressure medium cannot flow out of the working chamber any more directly via the pressure medium connection but only via the axial overflow channel.

The damping zone chamber term refers to the part of the cylinder interior that is delimited by the piston unit, the closure part and the cylinder tube when the piston ring has passed over the pressure medium connection. The damping zone chamber decreases with the progressing axial movement of the piston unit toward the axial end position.

The damping pressure medium volume is the part of the pressure medium that is enclosed in the damping zone chamber and flows out of it.

According to the invention, the piston unit including the piston ring according to the invention is designed to create a damping operating state of the working cylinder within the damping zone during a retracting movement.

During the retraction movement, the damping pressure medium volume is enclosed by the piston unit and thus the pressure in the damping zone chamber also increases relative to the pressure at the pressure medium connection.

According to the invention, in the damping operating state an overpressure of the damping pressure medium volume thus exists in comparison to the operating pressure. The overpressure of the damping pressure medium volume is hereinafter also abbreviated to damping overpressure. The operating pressure is the pressure of the pressure medium at the pressure medium connection, which corresponds to the pressure in the rest of the working chamber.

Due to the advantageous extreme tightness of the piston ring according to the invention, the pressure medium can only flow out in the damping operating state through the axial overflow channel according to the invention. The axial overflow channel cross section is designed such that the axial overflow channel throttles the outflow of the pressure medium. A force effect which counteracts the retraction movement of the piston unit is generated by the slowing-down of the outflow of the damping pressure medium volume.

The working cylinder with end-position damping according to the invention has the following advantages in particular, and several disadvantages of the prior art are simultaneously overcome thanks to the special design of the piston ring.

As a special advantage, a particularly high precision of damping is made possible. Due to the high tightness of the piston ring at the ring joint, the pressure medium overflow mainly occurs exclusively via the axial overflow channel. And the cross section of the axial overflow channel can be adjusted much more precisely than, in particular, the cross section of a piston ring gap according to the state of the art.

Another advantage is the special long-term stability of the damping behavior. In contrast to the state of the art, where wear significantly changes the cross section of a piston ring gap due to the circumferential change and thus the damping behavior, the tightness of the piston ring at its ring joint is not affected in this way according to the invention. Moreover, the cross section of the axial overflow channel is largely wear-resistant so that the damping behavior remains unchanged over very long periods of operation.

In addition, a solution was advantageously found in which the damping characteristics can be adjusted constructively in a simple manner to suit the specific application. In particular, if the axial overflow channel is designed in the form of an axial piston-ring groove, it is possible to hold available piston rings with different cross sections for the piston-ring axial groove and, thus, to configure end-position-damped working cylinders with the desired damping rate depending on the special requirements.

Advantageously, linear damping, progressive damping and other damping characteristics can be provided. Thus, if the axial overflow channel is designed in the form of an axial piston-ring groove, precise linear damping can be achieved in particular. Furthermore, if the axial overflow channel is designed in the form of an axial cylinder-tube groove, linear and progressive, degressive, section-graded or other damping characteristics can be made possible. If an axial cylinder-tube groove is designed with the same cross section along its longitudinal extension, linear damping is achieved. By reducing the cross section over the longitudinal extension in the direction of the end position, progressive damping can be set in a simple manner. Conversely, degressive damping can also be set in a simple manner by increasing the cross section in the direction of the end position. Furthermore, a solution of a cross section of the axial overflow channel that differs along the longitudinal extension can also be implemented by arranging several axial cylinder-tube grooves of different lengths, which are thus only effective in sections. Depending on the arrangement, gradually increasing or also gradually decreasing damping can be set. Particularly in the case of a relatively long damping zone, axial cylinder-tube grooves that extend axially only over a partial section of the damping zone can thus simultaneously provide stroke section damping with little effort.

Furthermore, it is advantageous that the end-position damping effect can be provided both in only one end position and in both end positions.

In addition, the solution can be used in different types of cylinders, e.g., in particular in differential working cylinders, synchronized cylinders, traction cylinders or plunger cylinders.

The elastic piston ring, which is tensioned against the inner wall of the cylinder, can also advantageously compensate for manufacture-caused deviations of the cylinder tube and thus permit a high damping precision.

Finally, a particular advantage is the high robustness, the high operational safety and the technologically good producibility.

According to a first advantageous further embodiment of the working cylinder with end-position damping, both the outer separating line and the inner separating line have a curvature radius which is concentric with respect to the ring body. In addition, both separating lines thus have a curvature radius that is concentric with respect to the other one and thus the same.

This development has the particularly advantageous effect that both at the radial ring surface, which is in sealing sliding contact to the inner barrel surface of the cylinder, and at the first ring surface, which is in sealing contact with the lateral surface of the ring groove of the piston, all the sealing surfaces involved come together and thus provide a particularly high level of tightness.

Furthermore, it is advantageously made possible that a change in the circumference of the piston ring does not have any effect on the tightness, since the separating surface of the projection section and the separating surface of the base section can move tangentially one to the other, i.e., along the curvature radius, and thus maintain the areal sealing physical contact.

According to a next advantageous further development, the separating surfaces of the ring body ends are designed as truncated-cone lateral surfaces.

In this design, the separating surface of the projection section, which is designed as a truncated-cone lateral surface, and the separating surface of the base section, which is designed as a truncated-cone lateral surface, are opposite to each other, wherein the separating surface of the projection section is a concave truncated-cone inner lateral surface and the separating surface of the base section is a convex truncated-cone outer lateral surface. The two opposing truncated-cone lateral surfaces have the same geometry and are capable to move both longitudinally and transversely relative to each other, thus ensuring a particularly high level of tightness.

Due to this shape of the separating surfaces, the sealing effect is maintained even in the event of changes in the circumference or in case of wear. Furthermore, the inclination relative to the axial ring groove surface of the outer ring groove increases the sealing surface pressure thanks to the radial force effect.

In a next advantageous further development, the separating surfaces are designed as wire erosion surfaces. This precise manufacturing process leads to surfaces with a high overlap accuracy of the projection section separating surface and the base section separating surface. Leakage through gaps between the separating surfaces, which can be caused by other manufacturing processes, is thus advantageously minimized or even completely eliminated. The result is a reliable sealing effect.

According to a further advantageous further development, the piston ring is provided with at least one weakening recess. Preferably, there are several weakening recesses which are distributed around the circumference at a uniform angular distance from each other and from the ring joint. This design reduces, in a uniform manner and distributed along the circumference, the spring-force-induced contact forces on an inner barrel surface of a cylinder and supports the free movement and self-adjusting effect between the projection section and the base section. And, at the same time, the advantageous contact forces caused by the damping overpressure of the pressure medium remain unimpaired. It is particularly advantageous that a piston ring of the same initial geometry and made of the same material can thus be adapted by the spring-force-induced contact pressure to the individual application requirements in a simple manner. The weakening recesses advantageously act like elastic joints that segment the piston ring along its circumference so that the segments formed in this way rest themselves more precisely against the inner wall of the cylinder tube.

According to a further advantageous embodiment, the first axial ring surface of the piston ring has an inclination opposite to the separating surfaces.

The term opposite inclination it is to be understood such that both the inclined ring surface and the separating plane each have an inclination relative to a main areal plane of the piston ring, wherein these inclinations are oriented toward a different side of the main areal plane.

Furthermore, the axial ring groove surface of the ring groove of the piston is correspondingly inclined in the same way. The inclined first axial ring surface of the piston ring is designed as a contact surface to the inclined axial ring groove surface of the ring groove so that both inclined ring surfaces rest in an areal contact one against the other.

The design as an inclined axial ring surface supports the dynamic expansion of the piston ring. This takes place via the obliquely acting force of the inclined axial ring surface. Thus, the axial force, resulting from the pressure load of the pressure medium, leads to an obliquely acting contact pressure at the inclined and, therefore, oblique ring surface of the ring groove of the piston. In addition, the wedge effect at the inclined ring surface leads to a radial expansion of the piston ring and to a force effect on the surface pressure between the radial ring surface and the inner barrel surface of the cylinder. This in turn provides an increased sealing effect in the damping operating state.

Another advantageous further development is characterized in that the axial overflow channel is designed as an axial cylinder-tube inner barrel surface groove and the axial cylinder-tube inner barrel surface groove has a cross section that is tapered in the end position direction.

The design of the axial overflow channel as an axial cylinder-tube inner barrel surface groove, abbreviated to axial cylinder-tube groove, with a cross section tapered in the end position direction has the effect that the outflow cross section available to the pressure medium is dependent on the position of the piston ring in the damping zone and thus on the axial position of the piston unit. Due to the cross section taper, the outflow cross section reduces the further the piston unit moves toward the end position. The force counteracting the retraction movement increases continuously. This results in progressive damping.

The simple and reliable feasibility of progressive damping is particularly advantageous. Whereas it is known from the prior art to use a piston ring with ring gap and to provide a conical design of the damping section, the effort required to produce a conical section is not necessary any longer according to the proposed solution. Instead, only an axial cylinder-tube groove must be produced, for example by milling. In addition, the damping rate can be precisely determined for each position in a particularly simple manner by the cross sectional course of the axial cylinder-tube groove.

According to an advantageous further development, the cylinder comprises a further damping zone in a further end region located axially opposite the end region.

According to this advantageous further development, the cylinder comprises a further laterally arranged pressure medium connection, wherein the further pressure medium connection is assigned to the further damping zone and is axially spaced from a further axial limitation of the cylinder interior opposite the axial limitation.

The function and design of the further pressure medium connection, the further damping zone and the further axial limitation basically correspond to the pressure medium connection, the damping zone and the axial limitation.

The further damping zone and the further pressure medium connection are arranged in spatial proximity to the second closure part at the second cylinder tube end.

According to the advantageous further development, the piston unit comprises a further piston ring axially opposite the piston ring. The piston ring and the further piston ring are also collectively referred to as the piston rings. Thus, the guide and the seal of the piston are located between the two piston rings. Furthermore, a further axial overflow channel exists according to this further development.

The further piston ring is formed analogously to the piston ring and is arranged on the opposite side of the piston unit. Despite their basically identical construction, the further piston ring and the further overflow channel can differ in their geometry and dimensioning from the piston ring and the axial overflow channel. For example, different damping characteristics can be realized at the two end positions of the piston unit. This is particularly useful for a very asymmetrically loaded working cylinder.

According to the advantageous further development, the piston unit is designed to have a further damping operating state within the further damping zone during a retraction movement.

With respect to the further damping zone, the further damping operating state correspondingly exhibits the features of the damping operating state.

The features of the damping operating states are in particular the pressure ratios and the positions of the piston rings relative to the pressure medium connection and the further pressure medium connection as well as the axial position of the piston unit.

The particular advantage of the just described further development is that end position damping effective in both end positions is also provided for double-acting working cylinders.

In addition, it is advantageous that the damping characteristics of each end position damping can be set independently of the ones of the other end position damping.

A further aspect of the invention is the damping piston ring according to the invention. By means of this claim, the damping piston ring is protected as an independent machine component.

The features of the damping piston ring correspond to the features of the piston ring as it has been described as a part of the working cylinder with end-position damping according to the invention. Therefore, the description sections related to the piston ring as a part of the working cylinder, including the advantageous further developments, are referenced for the description of the damping piston ring. The special tightness of the damping piston ring at its ring joint is essential.

Furthermore, the damping piston ring has at least one axial piston-ring outer lateral surface groove at its radial ring surface, which connects the axial ring surfaces. The axial piston-ring outer lateral surface groove, shortened to axial piston-ring groove, advantageously creates a precisely definable overflow cross section between the two axial sides of the damping piston ring.

As a special advantage, the damping piston ring produced represents a reliable precision damping piston ring for use in different damping devices as well as damping cylinders, for which, on the one hand, a piston ring with a ring joint is required and, on the other hand, a particularly exact damping behavior is desired. This is advantageously made possible by the precise definition of an overflow cross section. It is also advantageous that the cross section formed by the axial piston-ring grooves is delimited in one section by the inner wall of the cylinder. Due to the relative axial movement of the damping piston ring with respect to the cylinder wall, any dirt deposits in the axial piston-ring groove are always removed again, thus counteracting functional impairments. An axial groove is understood to mean that an axial connection is created between the axial ring surfaces. Advantageously, the axial piston-ring grooves can also be designed in an oblique or helical shape or with other modifications, for example to prevent unwanted run-in patterns at the inner wall of the cylinder.

By using an exemplary embodiment, the invention is explained in more detail on the basis of the attached drawings.

DETAILED DESCRIPTION OF THE INVENTION

The reference numerals denote the same features in all figures.

Figure 1:
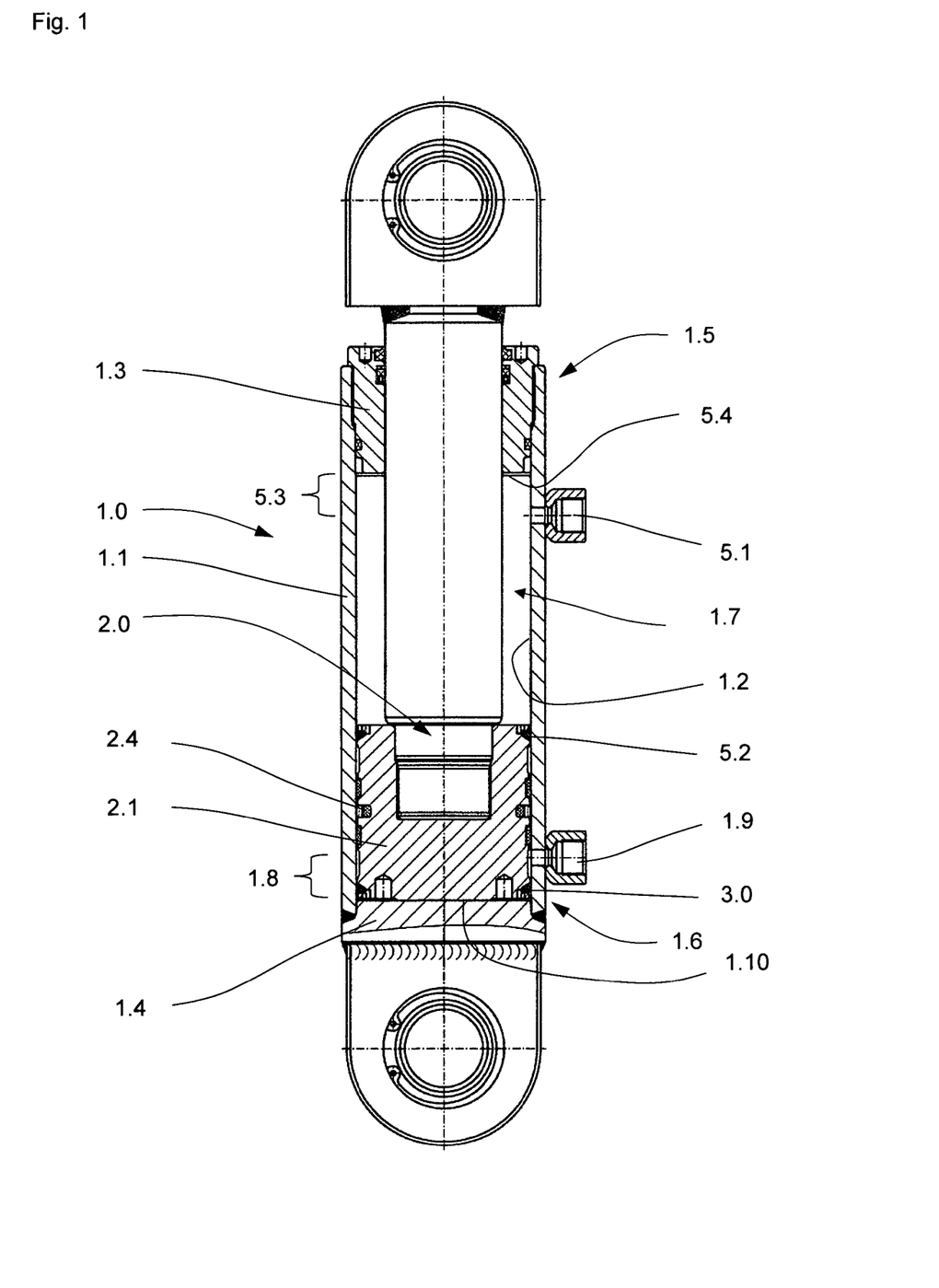
FIG. 1 Sectional view of a working cylinder with end-position damping as a differential cylinder with end-position damping on both sides FIG. 2 Top view of a piston ring FIG. 3 Cross sectional view of a piston ring FIG. 4 Detailed section of a piston ring at the ring body ends in an oblique view FIG. 5 Sectional view and schematic representation of the ring body ends with a rectangular basic cross section FIG. 6 Sectional view and schematic representation of the ring body ends with an inclined axial ring surface FIG. 7 Top view of a piston ring with weakening recesses FIG. 8 Top view of a piston ring with axial grooves, as well as cross sectional view and enlarged detail hereto FIG. 9 Sectional view and schematic representation of a cylinder wall with an axial cylinder-tube inner barrel surface groove.

FIG. 1 shows a general view of the working cylinder with end-position damping in a first embodiment. In this embodiment, end-position damping is realized on both sides of the differential working cylinder.

In this exemplary embodiment, the end-position damping is provided at the end position assigned to the second closure part 1.4. It is an end-position damping on the piston crown, which damps the retraction movement.

The further end position damping is provided at the end position assigned to the first closure part 1.3. This is an end position damping on the guide closure part, which damps the extension movement.

The working cylinder with end-position damping comprises a cylinder 1.0 and a piston unit 2.0.

The cylinder 1.0 comprises the cylinder tube 1.1, the first closure part 1.3 and the second closure part 1.4. The first closure part 1.3, designed as a guide closure part, is assigned to the first cylinder tube end 1.5, and the second closure part 1.4, designed as a bottom closure part, is assigned to the second cylinder tube end 1.6. The cylinder tube 1.1 is connected to each of the two closure parts 1.3, 1.4 in such a way that they enclose a cylinder interior 1.7.

In this embodiment, the inner side of the second closure part 1.4 forms an axial limitation 1.10, and the inner side of the first closure part 1.3 forms a further axial limitation 5.4, which delimits the axial movement space of the piston unit 2.0 arranged in the cylinder interior 1.7. The axial limitations 1.10, 5.4 are designed as stop surfaces for the piston unit 2.0 moving axially during operation.

At the cylinder tube 1.1, the pressure medium connection 1.9 is arranged at the second cylinder tube end 1.6 and the further pressure medium connection 5.1 is arranged at the first cylinder tube end 1.5.

The piston unit 2.0 comprises a piston 2.1 and a piston ring 3.0. In this exemplary embodiment, the piston unit 2.0 is composed of a piston rod and the piston 2.1, which are firmly connected to each other.

In this embodiment, the piston rod of the piston unit 2.0 is guided with the piston rod through the first closure part 1.3 and slidably supported therein.

The piston 2.1 is guided in the cylinder tube 1.1 by means of a guide 2.4.

As FIG. 1 further shows, the pressure medium connection 1.9 is arranged laterally at the cylinder tube 1.1 and in its axial position it is axially spaced relative to the axial limitation 1.10 as well as relative to the piston ring 3.0 in its axial arrangement in the end position. This axial spacing forms the damping zone 1.8.

In this embodiment, the piston 2.1 also comprises a further piston ring 5.2. Corresponding to its axial arrangement on the piston 2.1, it is axially spaced from the further pressure medium connection 5.1 when the piston 2.1 is in an end position on the guide side so that a further damping zone 5.3 is created. The explanations given to the damping zone 1.8 apply accordingly to the expansion and function of the further damping zone 5.3.

As the other figures also show in more detail, the piston ring 3.0 is accommodated in a ring groove 2.2 of the piston 2.1, and at its ring joint 3.7 it functions as a sealing due to the special design according to the invention.

Figure 2:
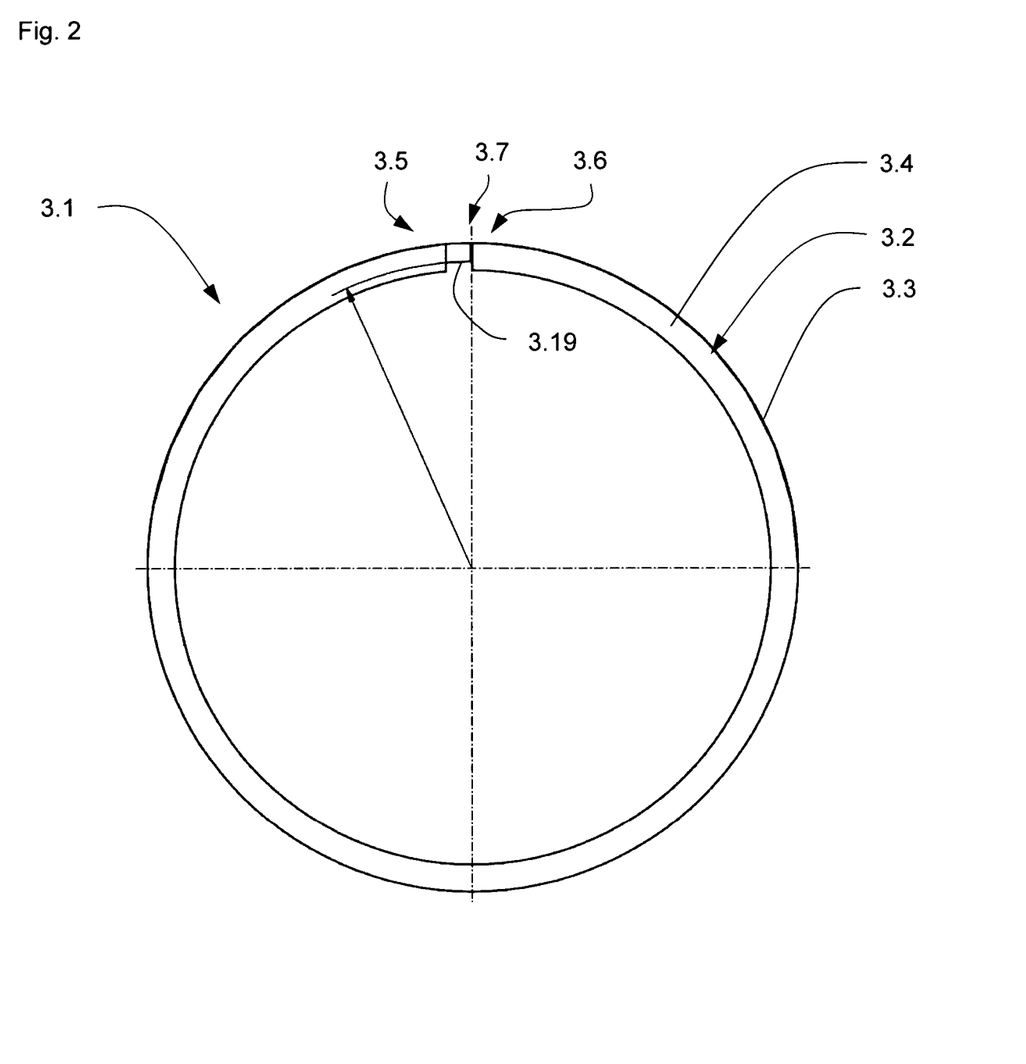

FIG. 2 shows the piston ring 3.0 in a top view along the main longitudinal axis that corresponds to the axis of movement of the piston 2.1. The ring body 3.1 is shown with the ring body surface 3.2 which comprises the radial ring surface 3.3 and the first axial ring surface 3.4. The ring body 3.1 is interrupted at one point. Here, a first ring body end 3.5 and a second ring body end 3.6 are located opposite to each other. The interruption in between is the ring joint 3.7.

The piston ring 3.0 is shown in the unassembled, relaxed manufacturing position, also referred to as the relaxation position. In this embodiment, the ring body ends 3.5, 3.6 do not project beyond each other in the relaxation position. An alternative design—not illustrated here—exhibits a partial projection into the respective other ring body end 3.5, 3.6 already in the relaxation position.

In FIG. 2, a circular arc with a radius arrow is drawn above the inner separating line 3.19 to show the concentric design of the inner separating line 3.19, which is essential for the invention.

Figure 3:
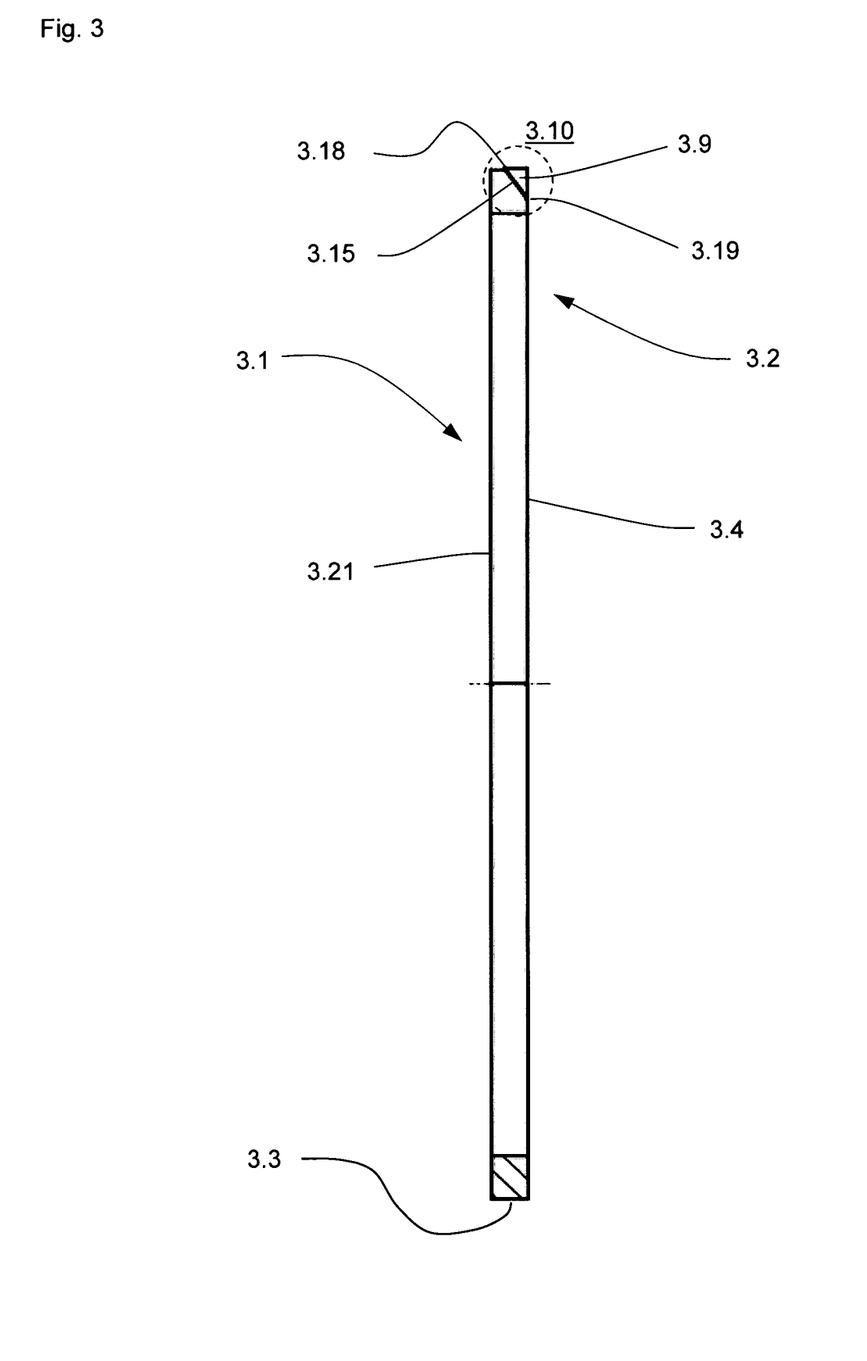

FIG. 3 shows the cross section of the ring body 3.1 through the ring joint 3.7. In this embodiment, the cross section has a substantially rectangular shape.

The ring body surface 3.2 denotes the surface of the entire piston ring 3.0. The outer lateral surface of the ring body 3.1 is the radial ring surface 3.3. On one of the two sides of the ring body 3.1, there is the first axial ring surface 3.4. Opposite to it, there is the second axial ring surface 3.21 by mean of which the piston ring 3.0 engages in the matching counter contour of the circumferential ring groove 2.2 of the piston 2.1.

Furthermore, the projection section 3.9 with the projection contour cross section 3.10—highlighted by the dashed encircling—as well as the projection section separating surface 3.15 are shown. The inner separating line 3.19 is at the first axial ring surface 3.4 and the outer separating line 3.18 is at the radial ring surface 3.3, both of which are concentric to each other and to the ring body 3.1 as a whole.

Figure 4:
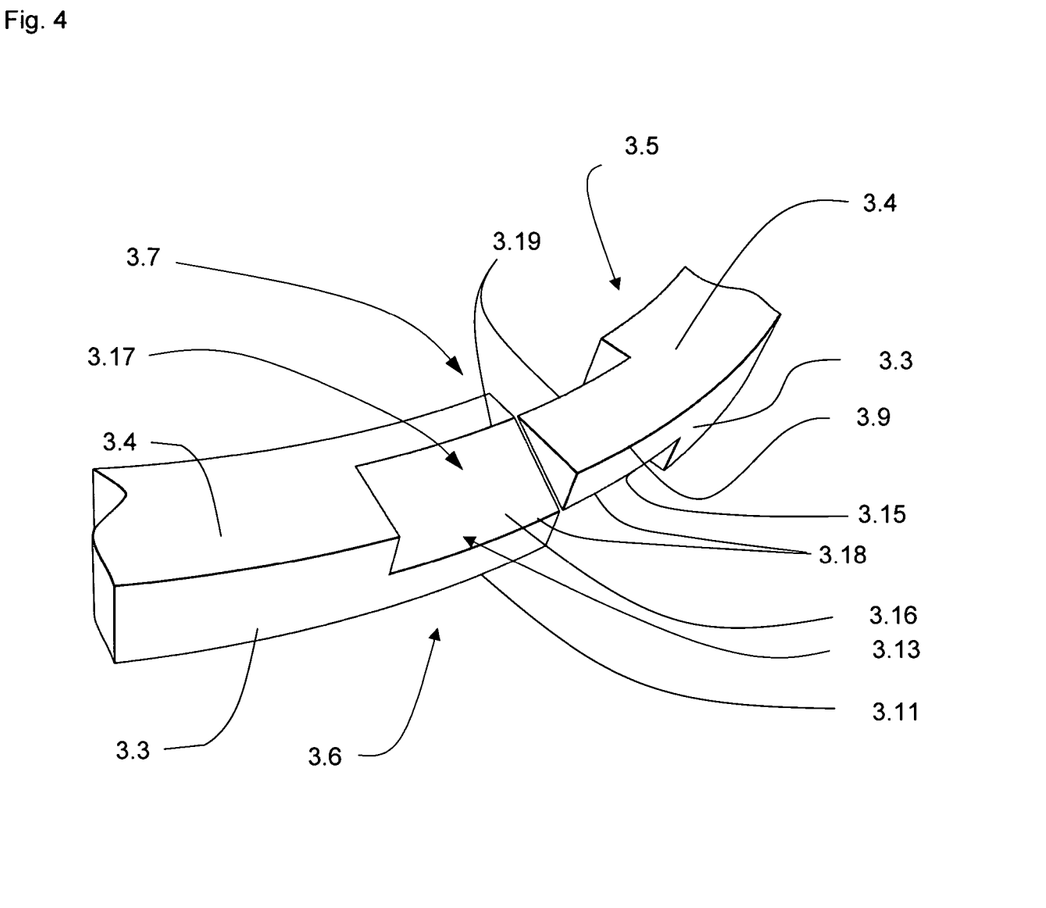

FIG. 4 shows the section of the piston ring 3.0 at the ring joint 3.7 and at the ring body ends 3.5, 3.6 in an oblique view.

The non-installed form of the piston ring 3.0 in the relaxation position is shown. The view depicts the outer side of the piston ring 3.0 in the direction of the radial ring surface 3.3. The first axial ring surface 3.4 is positioned orthogonally to it. The projection section 3.9 is provided at the first ring body end 3.5 and comprises—contrary to the direction of view in FIG. 3—the projection section separating surface 3.15.

The corresponding counterpart at the second ring body end 3.6 is the base section 3.11. The receiving contour 3.13 is defined by the separating plane 3.17; it forms the base section separating surface 3.16 and receives the projection section 3.9 in an areal manner. In the tensioned installation position, the projection section 3.9 lies flat with its projection section separating surface 3.15 on the base section 3.11, specifically on the base section separating surface 3.16. The separating plane 3.17 is formed here. Due to the flat contact of the projection section separating surface 3.15 and the base section separating surface 3.16 in the separating plane 3.17, the piston ring interrupted at the ring joint 3.7 is sealed again.

The separating plane 3.17 has the shape of a section of a truncated-cone lateral surface in the overlap zone of the projection section separating surface 3.15 and the base section separating surface 3.16 in this exemplary embodiment. The inner separating line 3.19 is created at the curved edge to the first axial ring surface 3.4, and the outer separating line 3.18 is created at the curved edge to the radial ring surface 3.3. The separating lines 3.18, 3.19 describe circular arcs which are arranged concentrically to the center of the circle of the ring body 3.1, which enables a congruent sliding of the projection section separating surface 3.15 and the base section separating surface 3.16 on each other during a circumferential expansion or circumferential reduction of the piston ring 3.0.

Figure 5:
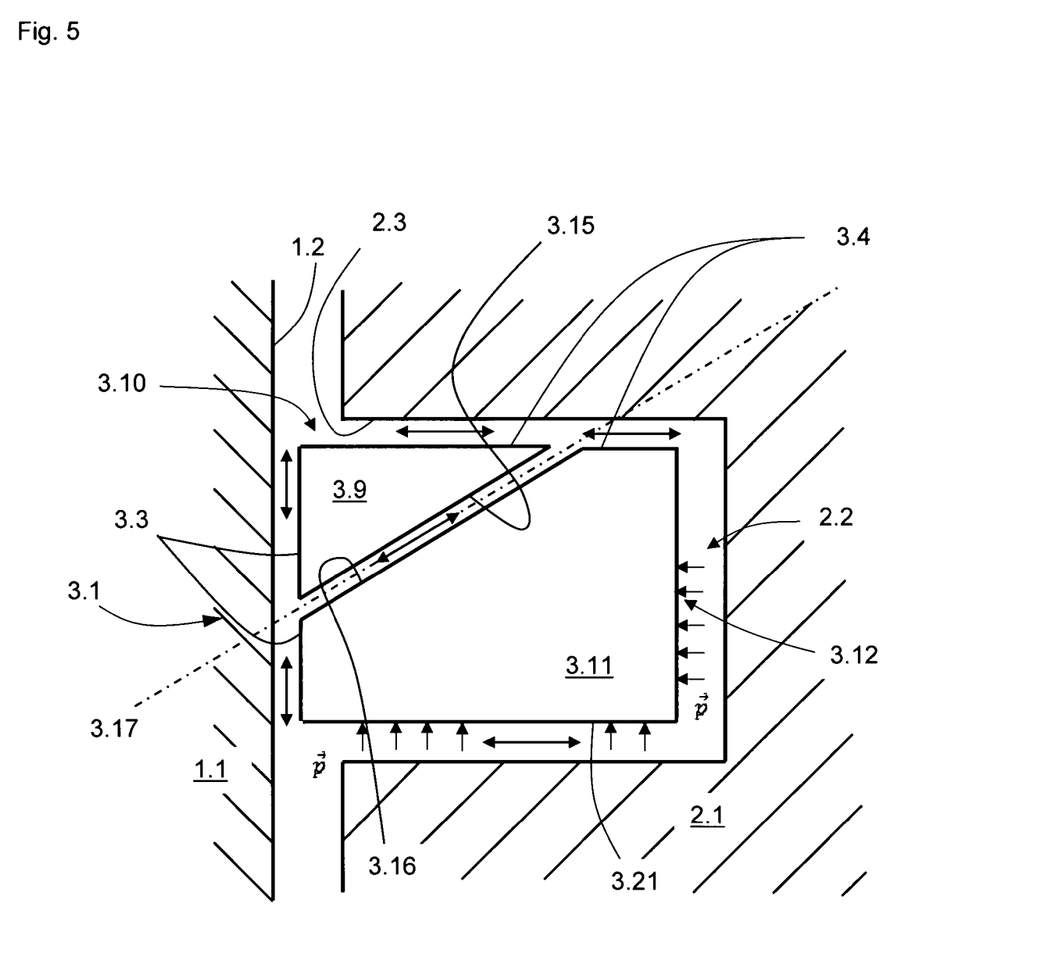
Figure 6:
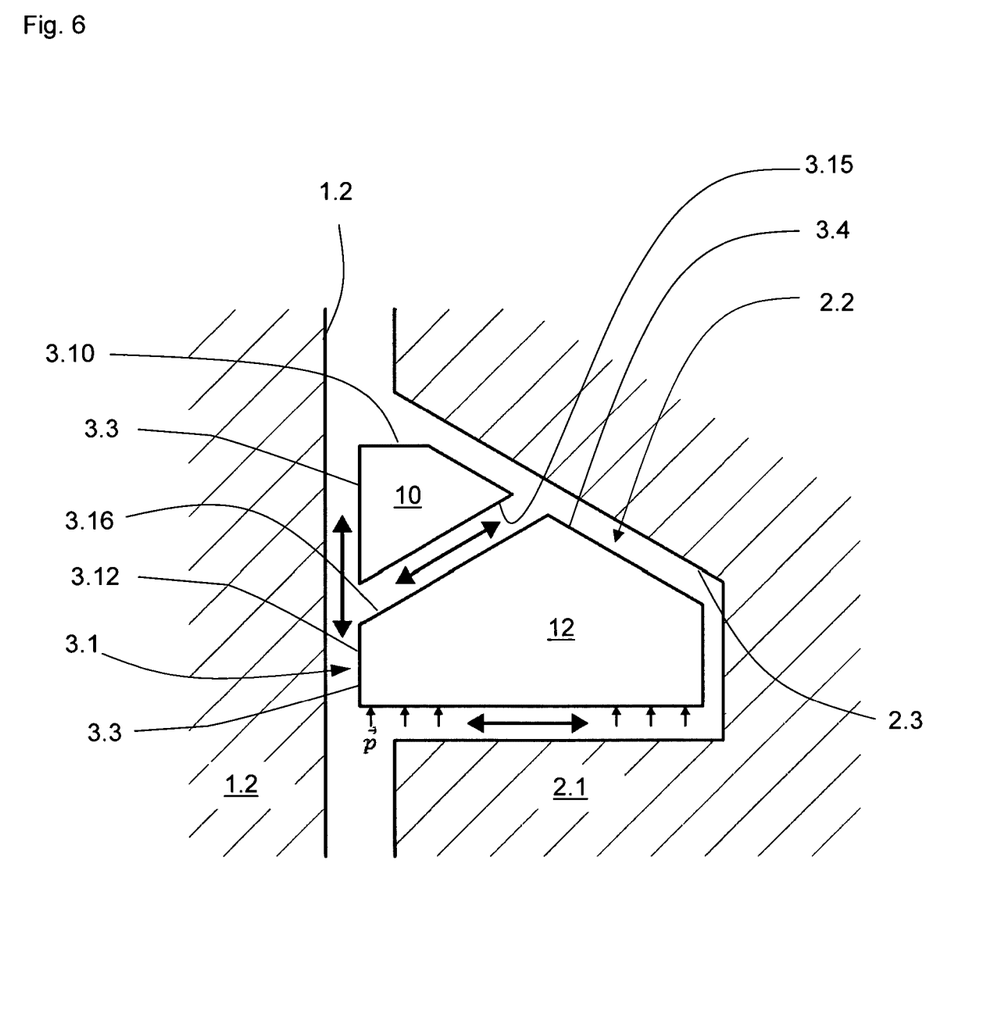

FIG. 5 and FIG. 6 show a schematic representation of the piston ring 3.0 in the installed state.

The exemplary embodiments in FIG. 5 and FIG. 6 differ in that, according to FIG. 5, the first axial ring surface 3.4 is arranged rectangularly to the radial ring surface 3.3 and thus the piston ring 3.0 has a substantially rectangular cross section, whereas the first axial ring surface 3.4 of the exemplary embodiment of FIG. 6 is inclined in the opposite direction with respect to the separating plane 3.17. The following explanations apply to both exemplary embodiments according to FIG. 5 and FIG. 6 because of their concordance in all other respects.

The individual gaps between the various components are enlarged for better viewing and are not true to scale. FIG. 5 and FIG. 6 are intended to schematically illustrate the position and movement relationships of the components as well as the acting forces.

Thus, according to FIG. 5 and FIG. 6, the ring body 3.1 is installed in the ring groove 2.2 of the piston 2.1. The ring groove 2.2 has an axial ring groove surface 2.3. When the piston 2.1 moves in the cylinder 1.0, the piston ring 3.0 slides with its radial ring surface 3.3 axially on the cylinder inner barrel surface 1.2 of the cylinder 1.0. The pressure medium acts with the pressure p on the second axial ring surface 3.21 of the piston ring 3.0. The piston ring is pressed in the ring groove 2.2 of the piston 2.1 against the axial ring groove surface 2.3 and slides with its first axial ring surface 3.4 in a floating manner thereon. At the same time, the pressure medium acts in the area of the groove base of the ring groove 2.2 against the radial inner ring surface of the piston ring (no reference numeral) and, depending on the pressure, causes the radial ring surface 3.3 to be pressed against the cylinder inner barrel surface 1.2 of the cylinder 1.0, which leads to an increased sealing effect at this sliding contact surface. In addition, the projection section 3.9—having its projection contour cross section 3.10—can slide with the projection section separating surface 3.15 on the base section separating surface 3.16 of the base section 3.11—having the base section contour 3.12—along the separating plane 3.17 both transversely—as indicated by the double arrow between the separating surfaces 3.15, 3.16—and longitudinally, i.e., along the circumference. At the same time, the projection section 3.9 and the base section 3.11 are axially displaceable with respect to each other along the radial ring surface 3.3 and the cylinder inner barrel surface 1.2 so that the gap between the separating surfaces 3.15, 3.16 can always be closed again, even in the event of wear.

This sliding of the separating surfaces 3.15, 3.16 transversely and longitudinally in conjunction with the axial displaceability of the sections 3.9, 3.11 enables the compensation for material erosion on the piston ring due to wear and always ensures an areal contact and thus a constant sealing effect during the service life.

Figure 7:
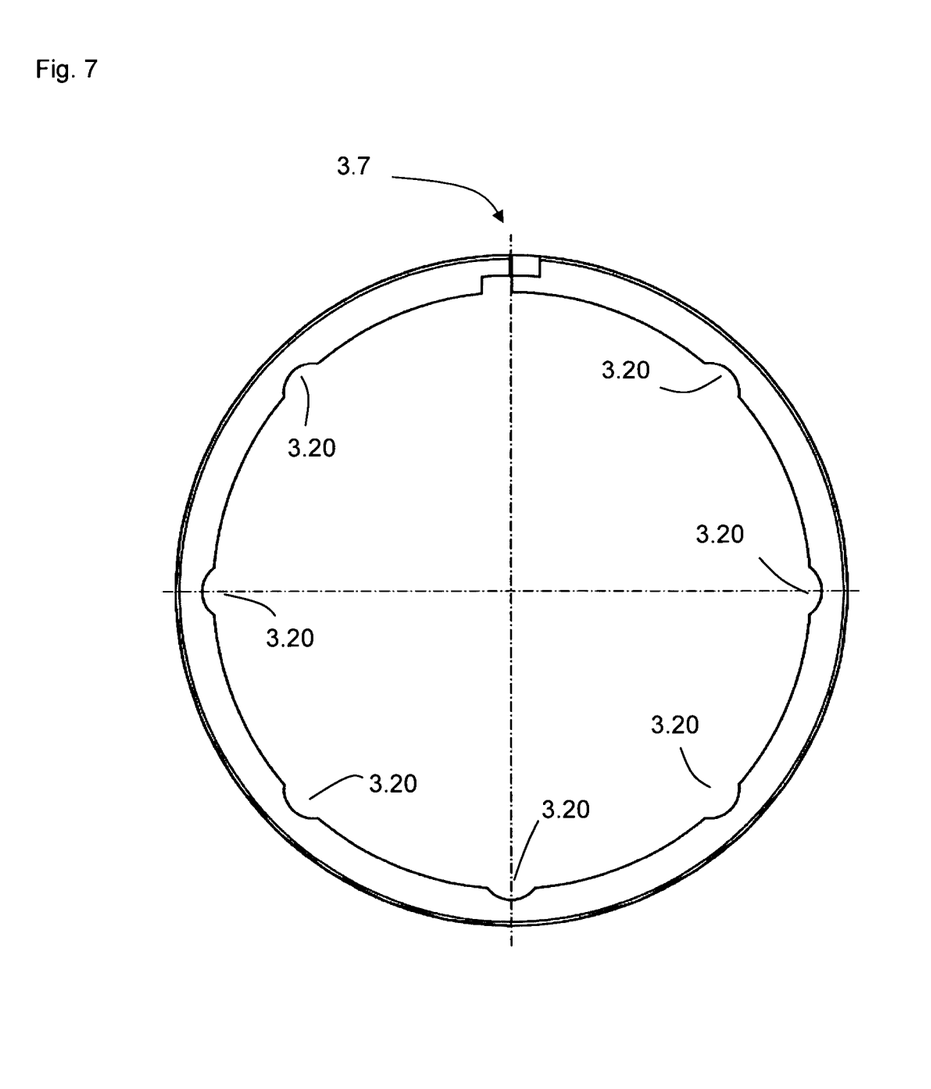

FIG. 7 shows a piston ring in which weakening recesses 3.20 are provided opposite the radial ring surface 3.3. A total of seven weakening recesses 3.20, which are arranged at an angle of 45 degrees to each other, are provided in the exemplary embodiment. Furthermore, the weakening recesses 3.20 adjacent to the ring joint 3.7 each enclose also an angle of 45 degrees with respect to the ring joint 3.7.

Due to the weakening recesses 3.20 and their uniformly distributed arrangement, the spring-force-induced contact forces against a cylinder inner barrel surface 1.2 of the cylinder 1.0 are reduced over the circumference in a uniformly-distributed manner, and the free movability and self-adjusting effect between the projection section 3.9 and the base section 3.11 are supported. And, at the same time, the advantageous contact pressure forces effected by the operating pressure of a pressure medium remain unimpaired.

Figure 8:
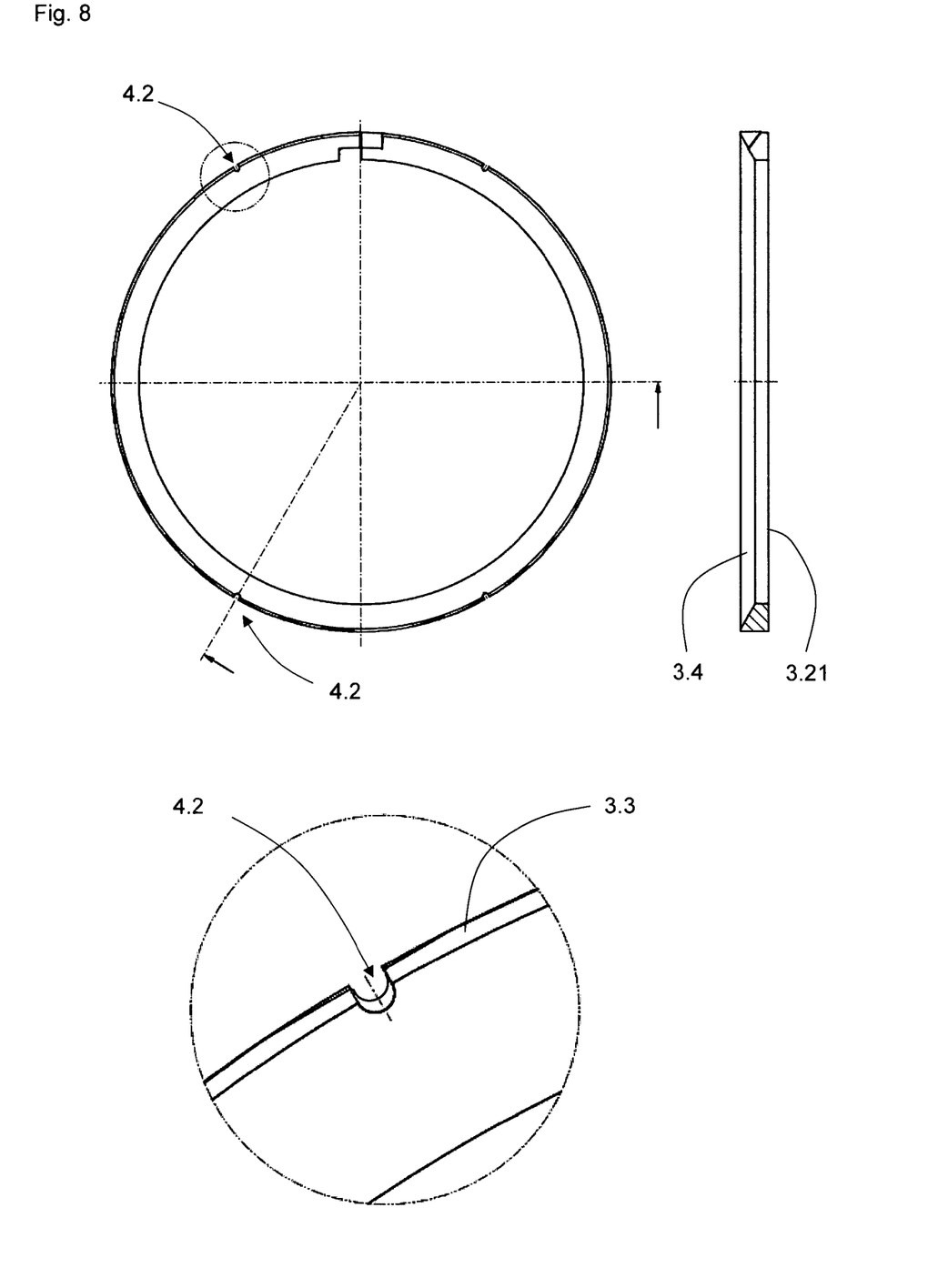

FIG. 8 shows an exemplary embodiment of the piston ring 3.0 of the working cylinder with end-position damping and also an exemplary embodiment of the damping piston ring as such. The first axial ring surface 3.4 is inclined in this embodiment.

In this exemplary embodiment, the piston ring comprises several axial grooves 4.2 distributed around its outer circumference and only two of them, serving as representatives for all, are provided with a reference numeral.

As shown in particular by the enlarged detail, the axial piston-ring outer lateral surface grooves 4.2 extend axially between the first axial ring surface 3.4 and the second axial ring surface 3.21. Thus, the axial piston-ring outer lateral surface grooves 4.2 form an overflow cross section for a pressure medium. Since the piston ring is furthermore designed to be sealing according to the invention, an exact cross section and thus an exact pressure loss can be defined in this way.

Figure 9:
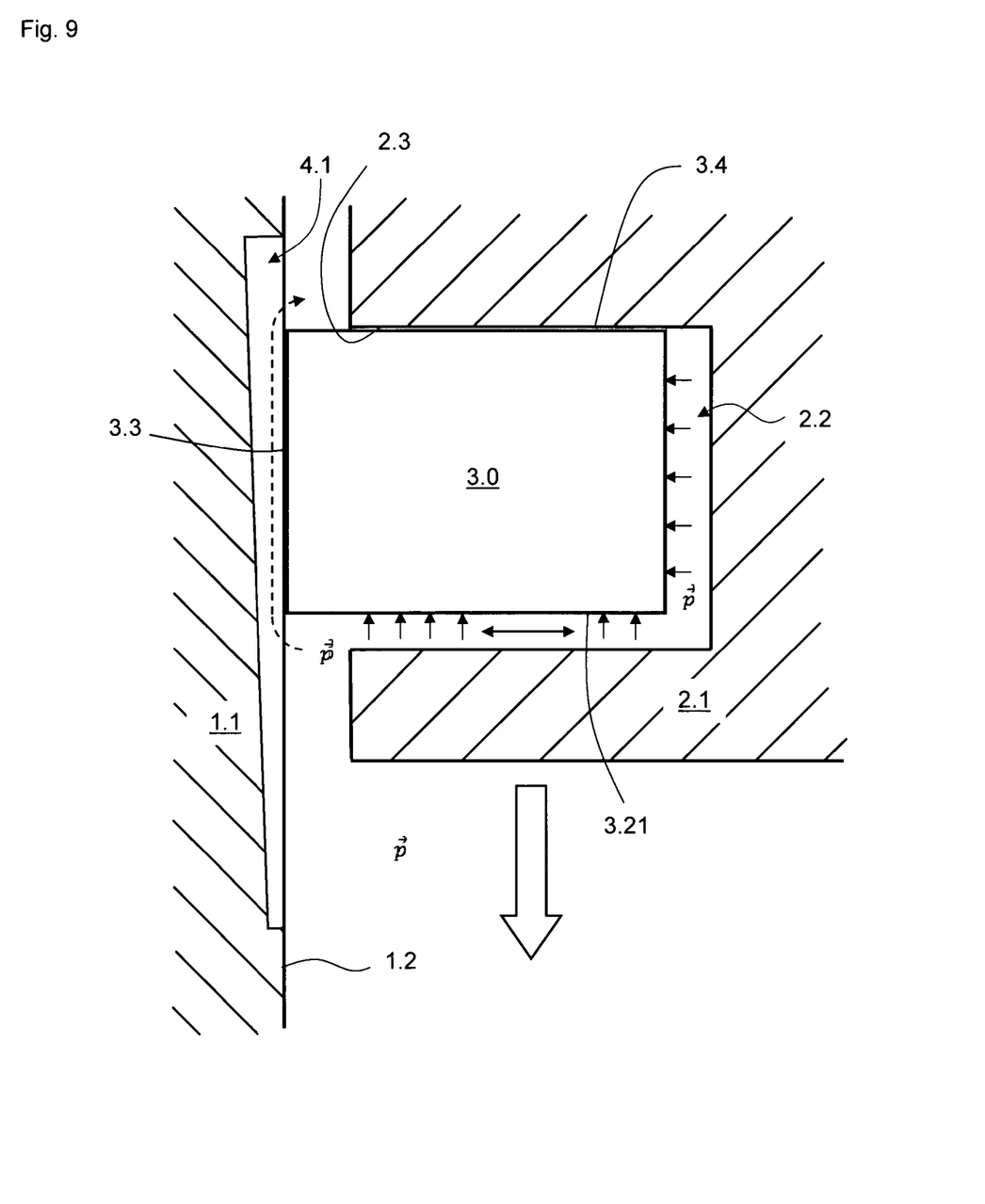

FIG. 9 shows a schematic representation of an exemplary embodiment in which the axial overflow channel is designed as an axial cylinder-tube inner barrel surface groove 4.1.

In this embodiment, an axial cylinder-tube inner barrel surface groove 4.1, the cross section of which reduces toward the end position, is milled into the cylinder tube 1.1. When the piston 2.1 moves with the piston ring 3.0 arranged in the ring groove 2.2 in the direction of the end position (shown by the large arrow pointing downwards), the pressurized medium can only overflow over the channel formed by the axial cylinder-tube inner barrel surface groove 4.1 and the radial ring surface 3.3 (shown by the dashed arrow). The more the axial position of the piston 2.1 with the piston ring 3.0 moves toward the end position, the smaller will be the cross section available for the pressure medium overflow. This provides progressive damping.

LIST OF REFERENCE NUMERALS 1.0 cylinder
1.1 cylinder tube
1.2 cylinder inner barrel surface
1.3 first closure part
1.4 second closure part
1.5 first cylinder tube end
1.6 second cylinder tube end
1.7 cylinder interior
1.8 damping zone
1.9 pressure medium connection
1.10 axial limitation
2.0 piston unit
2.1 piston
2.2 ring groove
2.3 first axial ring groove surface
2.4 guide
3.0 piston ring
3.1 ring body
3.2 ring body surface
3.3 radial ring surface
3.4 first axial ring surface
3.5 first ring body end
3.6 second ring body end
3.7 ring joint
3.9 projection section
3.10 projection contour cross section
3.11 base section
3.12 base section contour
3.13 receiving contour
3.14 receiving contour cross section
3.15 projection section separating surface
3.16 base section separating surface 3.17 separating plane
3.18 outer separating line
3.19 inner separating line
3.20 weakening recess
3.21 second radial ring surface
4.1 axial cylinder-tube inner barrel surface groove
4.2 axial piston-ring outer lateral surface groove
5.1 further pressure medium connection
5.2 further piston ring
5.3 further damping zone
5.4 further axial limitation

The invention claimed is:

1. A working cylinder with end-position damping, comprising:
   a cylinder having a cylinder tube, an inner barrel surface a first closure part, and a second closure part, said cylinder tube including a first cylinder tube end and a second cylinder tube end, said first closure part is arranged at said first cylinder tube end and said second closure part is arranged at said second cylinder tube end, said cylinder tube and said closure parts define a cylinder interior, said cylinder including a damping zone in at least one end region of said cylinder, said cylinder including at least one laterally arranged pressure medium connection, said pressure medium connection being assigned to said damping zone and being axially spaced from an axial limitation of said cylinder interior;
   a piston unit slidably passing through said first closure part and defining at least one working chamber in said cylinder interior, said piston unit having a piston and a piston ring, said piston having a circumferential ring groove on a radial outer lateral surface thereof, said piston ring being arranged in said ring groove and said piston ring resting resiliently against said inner barrel surface;
   said piston ring including a ring body and a ring joint, said ring body including a ring body surface having a radial ring surface and a first axial ring surface and a second axial ring surface, said radial ring surface being constructed as a sliding contact surface axially displaceable with respect to said inner barrel surface (1.2), said first axial ring surface being constructed as a contact surface for resting on an axial ring groove surface of said ring groove;
   said ring body including a first and a second ring body end being arranged opposite to each other at said ring joint and defining said ring joint, said first ring body end having a projection section with a projection contour cross section, said second ring body end having a base section with a base section contour, said base section defining a receiving contour with a receiving contour cross section, said projection section engaging in said receiving contour and said receiving contour cross section and said projection contour cross section coincide, a projection section separating surface of said projection section and a base section separating surface of said base section being opposite to each other in an areal and sealing physical contact and defining a separating plane, said separating plane having an inclination with respect to said first axial ring surface, said separating plane intersecting said radial ring surface and an outer separating line being defined at an intersection line of said separating plane with said radial ring surface, said separating plane intersecting said first axial ring surface and an inner separating line being defined at an intersection line of said separating plane with said first radial ring surface, said separating lines delimiting said separating surfaces and at least one of said separating lines having a radius of curvature concentric with respect to said ring body;
   at least one axial overflow channel which is constructed as an axial cylinder-tube inner barrel surface groove being arranged in said cylinder tube in said damping zone or as an axial piston-ring outer lateral surface groove, being arranged in said radial ring surface, said piston unit being constructed for passing axially, with said piston ring, over said pressure medium connection during a retraction movement into said damping zone and for enclosing a damping pressure medium volume in a damping zone chamber in said damping zone, said piston unit being constructed for exhibiting a damping operating state within said damping zone during a retraction movement, an overpressure of the damping pressure medium volume relative to said pressure medium connection exists in the damping operating state and said axial overflow channel being constructed for a throttled outflow of the damping pressure medium volume.

2. The working cylinder with end-position damping according to claim 1, wherein said outer separating line and said inner separating line have a radius of curvature which is concentric with respect to said ring body and to each other.

3. The working cylinder with end-position damping according to claim 1, wherein said separating surfaces are constructed as truncated-cone lateral sub-surfaces.

4. The working cylinder with end-position damping according to claim 3, wherein said separating surfaces are constructed as wire erosion surfaces.

5. The working cylinder with end-position damping according to claim 1, wherein said ring body has at least one weakening recess arranged radially on the inside.

6. The working cylinder with end-position damping according to claim 1, wherein said first axial ring surface of said piston ring has an inclination opposite to said separating surfaces.

7. The working cylinder with end-position damping according to claim 1, wherein said axial overflow channel is constructed as an axial cylinder-tube inner barrel surface groove and said axial cylinder-tube inner barrel surface groove has a cross section which is tapered in the direction of the end position.

8. The working cylinder with end-position damping according to claim 1, wherein said cylinder has a further damping zone in a further end region located axially opposite to said end region, said cylinder has a further laterally arranged pressure medium connection assigned to said further damping zone and which is axially spaced from a further axial limitation of said cylinder interior located opposite said axial limitation;
   said piston unit has a further piston ring located axially opposite said piston ring, said piston unit is constructed to pass axially, with said further piston ring, over said further pressure medium connection during a retraction movement into said further damping zone and to enclose a further damping pressure medium volume in a further damping zone chamber in said further damping zone, said piston unit is constructed to exhibit a further damping operating state during a retraction movement within said further damping zone, the further damping operating state exhibits the features of the damping operating state referred to said further damping zone.

9. A damping piston ring, comprising:

a ring body and a ring joint, said ring body having a first and a second ring body end arranged opposite to each other at said ring joint, for defining said ring joint, said ring body including a ring body surface having a radial ring surface and a first axial ring surface and a second axial ring surface, said radial ring surface being constructed as a sliding contact surface axially displaceable with respect to a cylinder inner barrel surface of a cylinder, said first axial ring surface being constructed as a contact surface for resting in an axial ring groove surface of a ring groove of a piston, said first ring body end having a projection section with a projection contour cross section, said second ring body end having a base section with a base section contour, said base section defining a receiving contour with a receiving contour cross section, said projection section engaging in said receiving contour and said receiving contour cross section and said projection contour cross section coincide, a projection section separating surface of said projection section and a base section separating surface of said base section being located opposite to each other in an areal and sealing contact and defining a separating plane, said separating plane having an inclination with respect to said first axial ring surface, said separating plane intersecting said radial ring surface and an outer separating line being defined at an intersection line of said separating plane with said radial ring surface, said separating plane intersecting said first axial ring surface and an inner separating line being defined at an intersection line of said separating plane with said first axial ring surface, said separating lines delimiting said separating surfaces and at least one of said separating lines having a radius of curvature being concentric with respect to said ring body, said radial ring surface having at least one axial piston-ring outer lateral surface groove connecting said axial ring surfaces.

* * * * *